(12) United States Patent
Kazlauskas

(10) Patent No.: US 7,869,234 B2
(45) Date of Patent: Jan. 11, 2011

(54) POLY-PHASE AC/DC ACTIVE POWER CONVERTER

(75) Inventor: William J. Kazlauskas, Woodstock, NY (US)

(73) Assignee: Ametek, Inc., Paoli, PA (US)

( * ) Notice: Subject to any disclaimer, the term of this patent is extended or adjusted under 35 U.S.C. 154(b) by 106 days.

(21) Appl. No.: 12/410,763

(22) Filed: Mar. 25, 2009

(65) Prior Publication Data

US 2010/0246228 A1    Sep. 30, 2010

(51) Int. Cl.
*H02M 1/12* (2006.01)
*G05F 1/70* (2006.01)

(52) U.S. Cl. .......................... 363/44; 323/207; 363/49

(58) Field of Classification Search ................ 363/44, 363/45, 49, 127; 323/207
See application file for complete search history.

(56) References Cited

U.S. PATENT DOCUMENTS 5,491,624 A * 2/1996 Levran et al. ............... 363/87
5,959,852 A   9/1999 Deloy et al. ................ 363/45
6,850,426 B2  2/2005 Kojori et al. ............... 363/123

* cited by examiner

*Primary Examiner*—Shawn Riley
(74) *Attorney, Agent, or Firm*—Renner Kenner Greive Bobak Taylor & Weber

(57) ABSTRACT

A three-phase AC/DC active power converter provides an H-bridge that is controlled by a DSP (digital signal processing) controller that places the H-bridge in a voltage-boost mode of operation when voltage of a DC-link capacitor maintained by the H-bridge is near than the voltage input from a three-phase power source. The voltage difference between the boosted DC-link voltage and the three-phase power source voltage provides a voltage potential thereby giving the control loops a possible gain value. The gain value provides loop stability to thereby prevent an inrush of electrical current into the power converter upon startup. The converter also allows harmonic distortion to be modified through wave shaping of the normally pure sinus conduction signal.

20 Claims, 6 Drawing Sheets

Where φ is normally =Sin(φ)
Here ψ= Sin(φ)+2*Sin(φ+n)+3*Sin(φ+m)+4*Sin(φ+p)+...

POLY-PHASE AC/DC ACTIVE POWER CONVERTER

TECHNICAL FIELD

The present invention is generally directed to AC/DC active power converters. Particularly, the present invention relates to a poly-phase AC/DC active power converter for use with a variable frequency generator. More particularly, the present invention is directed to an AC/DC active power converter that is reconfigured on start-up to operate in a voltage boost mode to generate a gain voltage to reduce electrical current spikes otherwise seen by the power converter. Additionally, the present invention is directed to an AC/DC active power converter that utilizes real-time geometric calculations to identify the conduction phase angle of the input power, so as to output power having a unity power factor.

BACKGROUND ART

Electrical generation systems often provide power consumed by power converters, such as three-phase AC/DC or AC/AC power converters. These power converters modify incoming AC (alternating current) power so that it is output with different electrical specifications. For example, electrical generators may supply power with varying operating frequencies, as in the case of generators used aboard certain aircraft, which are driven directly by the operation of the aircraft's jet engine. Because the jet engine's speed also controls the aircraft thrust, the speed must be varied, which results in AC (alternating current) power having a widely-varying primary operating frequency around the base frequency, such as 400 Hz. Unfortunately, the components that are to be powered in many applications are designed to operate within narrow bands of incoming line frequency and voltages. Additionally, designers of power distribution grids impose demanding specifications that must be met by the loads connected to the grid to enable the safe distribution of power thereto. For example, current and voltage distortion [Total Harmonic Distortion (THD)], as well as voltage and current phasing (Power Factor), are often restricted to maximum levels to protect the power generator and the distribution grid, as well as various electronic components and equipment coupled to the grid.

To overcome the problems associated with the varying frequency of the AC power output by such variable frequency power generators, power converters have utilized various power transformer designs. Specifically, power transformers have been designed to provide multiple phase outputs that are rectified and then fed to a DC-link capacitor for supply to a DC bus. However, the rectification of the incoming AC power by the transformer may result in uncorrected and unavoidable power factor shifts, while injecting an undesirable level of harmonic distortion back onto the power grid. To minimize these drawbacks, poly-phase transformers have been developed to increase the frequency of the generated harmonic distortion to a more acceptable level. Because the performance of such transformer designs tends to be dependent on phase voltage balance, line reactors are required to smooth and balance the capacitor charging currents supplied by the poly-phase transformer, which contributes additional weight, size, and cost to the power supply. Thus, while existing transformer designs provide adequate performance, they are deficient with regard to their large size, significant weight, and excessive cost, and do not compensate for load power factor, thus rendering power converters using such transformers undesirable.

In order to improve upon the deficiencies of the transformer-based converters, all-electronic converters, also referred to as active power converters, have been developed. These converters typically operate by transferring the energy available at the incoming main power source to the DC supply or link capacitor by controlling currents through an inductor. Specifically, the active power converter uses a current loop regulator to control the currents through the inductor in accordance with a control loop system that is adjusted based on the converter's operating conditions, to enable its stable operation. However, upon start up of the converter, the lack of voltage potential between the incoming mains and the DC bus, to which the converter is coupled, compromises control loop stability due to the lack of a forcing function (voltage difference) to provide the required gain for the control loop to correctly operate. This can result in initial startup currents that are largely uncontrolled, which places a significant amount of electrical stress on the components of the power converter and the power grid, resulting in a reduction in their operational reliability. Thus, while active power converters can provide power factor correction in a reduced form factor, that is lightweight, they can suffer from startup current spikes, undesirable even-harmonic line distortion, and errors as the operating frequency of the mains power source changes.

Furthermore, active power converters that provide power factor control require line synchronization, which allows the controller to consume current in phase with the line voltage of the power source. Currently, phase-locked loop (PLL) based line synchronization methods are generally used for controlling the power factor in many power applications. During operation, the PLL operates as a timer where synchronization occurs at a phase zero crossing voltage of the input line power, whereby the PLL generates the required steps between successive zero crossings to presume the phase angle of the incoming line power. While the synchronization established by the PLL mitigates any cumulative error, errors during each cycle of the input line power still occur. Thus, while PLLs generally provide acceptable performance under steady state conditions, they can produce significant errors during transient conditions when the frequency of the input line power is changing, which frequently occurs, when a variable frequency power source is used to supply power to the converter.

Therefore, there is a need for a poly-phase AC/DC active power converter that provides a regulated DC voltage power bus, while maintaining a unity or near-unity power factor and providing low total harmonic distortion on both the current and voltage waveforms carried on the lines from a three-phase power source. In addition, there is a need for a poly-phase AC/DC active power converter that utilizes real-time geometric calculations to monitor frequency changes in the power output by a variable frequency power source in order to correct and provide unity or near-unity power factor. Furthermore, there is a need for a poly-phase AC/DC active power converter that can be initially reconfigured at start-up as a boost regulator to increase voltage on a DC-link capacitor in order to provide gain value so as to reduce or eliminate the uncontrolled inrush of current spikes into the power converter.

SUMMARY OF THE INVENTION

In light of the foregoing, it is a first aspect of the present invention to provide a poly-phase AC/DC active power converter.

It is another aspect of the present invention to provide a poly-phase AC/DC active power converter to convert AC power from a poly-phase variable frequency power source into DC power, comprising an H-bridge converter maintaining a capacitor at its output, the converter adapted to receive each of the phases of AC power source at its input through respective line reactors inline therewith, a controller coupled to the H-bridge converter to control the converter in accordance with a control structure, wherein upon the initial powering of the H-bridge, the controller enters a voltage boost mode, such that the line reactors are charged and discharged into the capacitor to raise its voltage above that of the power source, to generate a gain value used by the control structure to control the current consumed from the power source, so as to maintain a constant output voltage during the start up of a normal AC/DC conversion mode, so as to reduce an inrush of current during the conversion of AC power into DC power.

Yet another aspect of the present invention is a method of controlling an H-bridge to convert AC power from a poly-phase power source into DC power comprising providing an H-bridge power converter maintaining a DC-link capacitor at its output, providing a controller to control the H-bridge in accordance with a control structure, coupling the input of the H-bridge to the power source, operating the H-bridge in a boost mode, so as to charge the DC-link capacitor to a voltage above the voltage of the power source to generate a gain value, executing the control structure with the gain value to control the current consumed by the converter to maintain a constant output voltage, and operating the H-bridge in a normal mode, so as to convert AC power from the power source into DC power.

Still another aspect of the present invention is a method of controlling an AC/DC power converter to convert AC power from a 3-phase power source into DC power comprising providing an H-bridge having a DC output bus, which maintains a DC-link capacitor, providing a controller to control the H-bridge in accordance with a control structure, representing at least 2 of the 3 phase voltages output from the power source as vectors in two-phase rotary coordinates, calculating a conduction angle of the power consumed from the 3-phase power source from the vectors using an arc-tangent function, and controlling the H-bridge to adjust the phase angle of the current consumed from the power source to match the phase angle of the voltage provided by the power source at the DC output bus, to provide unity power factor.

BRIEF DESCRIPTION OF THE DRAWINGS

For a complete understanding of the objects, techniques and structure of the invention, reference should be made to the following detailed description, appended claims, and accompanying drawings, wherein:

BEST MODE FOR CARRYING OUT THE INVENTION

Figure 1:
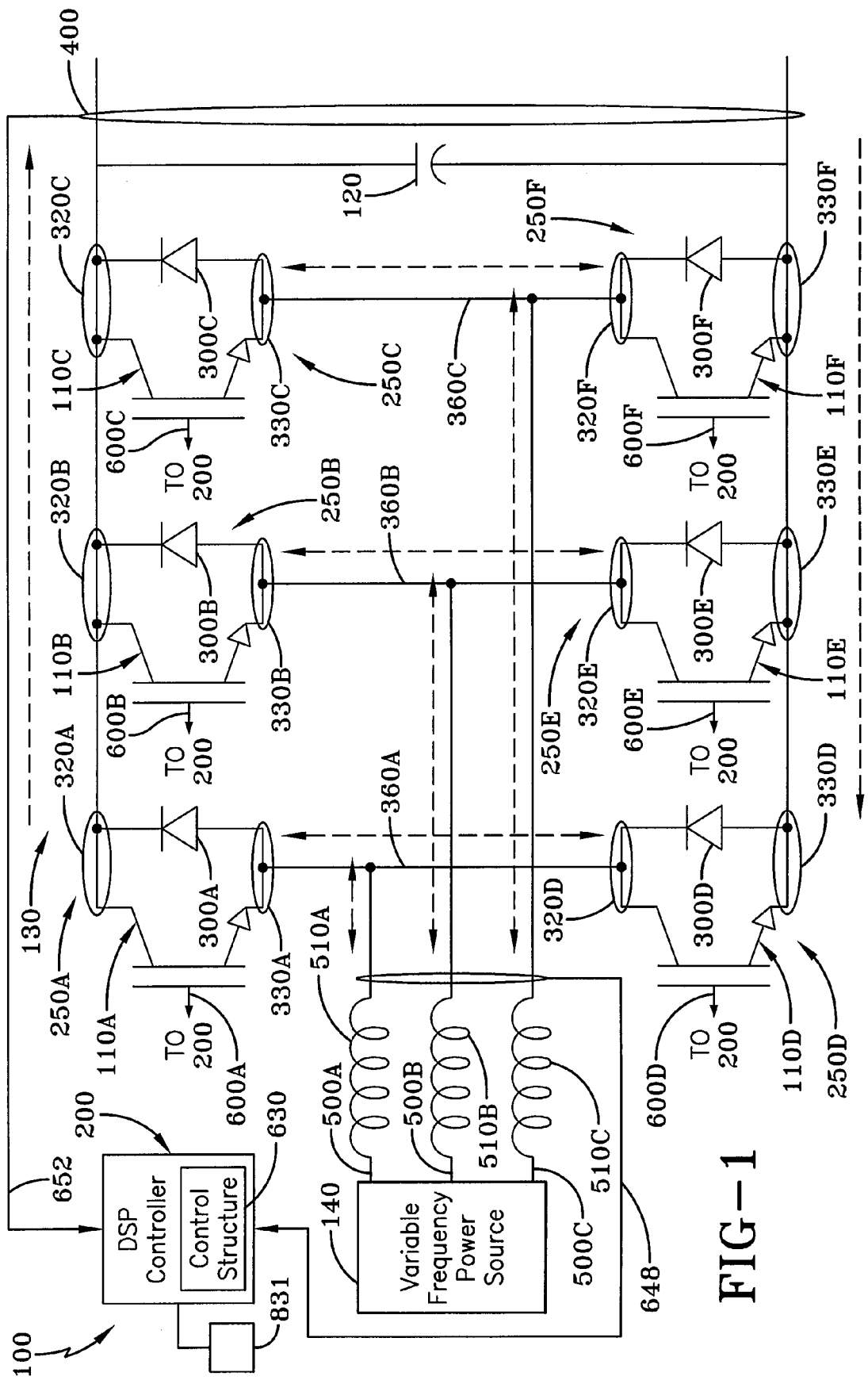
FIG. 1 is a schematic view of a poly-phase AC/DC active power converter controlled by a digital signal processing (DSP) controller in accordance with the concepts of the of the present invention.

A poly-phase AC/DC active power converter is generally referred to by the numeral 100, as indicated in FIG. 1 of the drawings. The power converter 100 utilizes a plurality of insulated-gate bipolar transistors (IGBT) 110A-F and a DC-link capacitor 120 configured as a three-phase active H-bridge 130 to convert AC (alternating current) power received from a three-phase variable frequency power source 140, which generates power at varying frequencies, into DC (direct current) power. To reduce the inrush of electrical current into the converter 100 upon a cold start, or initial operation, of the converter 100, where the DC-link capacitor voltage is zero, a DSP (digital signal processing) controller 200 follows a control structure, which controls the IGBTs 110A-F in a predetermined sequence, to reconfigure the H-bridge 130 to operate in a boost regulation mode.

In the boost regulation mode, the converter 100 operates as a boost rectifier, such that the voltage at the DC-link capacitor 120 maintained by a DC output bus is raised above that of the voltage of the variable frequency power source 140 by a predetermined amount. The difference between the two voltages establishes a voltage potential, which forms a gain value that is used to initialize the current controller maintained by the control structure of the DSP controller 200. That is, once the voltage difference value (gain) is reached, the control structure reconfigures the H-bridge 130 to operate in its normal AC/DC conversion mode, and the gain value is used during its initial start-up to provide stability to the control structure, so as to prevent the inrush of uncontrolled electrical current into the H-bridge 130, which would otherwise result in the distortion of AC power that is consumed from the power source 140, thereby stressing the electrical component converter 100. The power converter 100 also utilizes geometric computations to determine the actual conduction angle of the power consumed by the converter 100 from the variable frequency power source 140 in real-time, thus reducing the errors generated by prior art AC/DC converters that utilize phase-locked loops (PLLs). As such, the converter 100 consumes current in phase with the voltage supplied from the power source 140, so as to provide a unity or near-unity power factor with very low total harmonic distortion on both current and voltage throughout a wide range of AC frequencies. Furthermore, while the following discussion relates to the use of the power converter 100 with three-phase power sources, the converter 100 may be readily adapted for use with power sources having any number of phases.

The power converter 100 includes the H-bridge 130 that is comprised of a network of switching elements 250A-F that are comprised of IGBTs 110A-F and parallely-coupled diodes 300A-F. Specifically, the IGBTs 110A-F are coupled to respective diodes 300A-F, such that the cathode of each diode 300A-F is coupled to the collector (C) terminal of its associated IGBT 110A-F to form collector nodes 320A-F, while the anode of each diode 300A-F is coupled to the emitter (E) terminal of its associated IGBT 110A-F to form emitter nodes 330A-F. The switching elements 250A-C are respectively arranged in series with switching elements 250D-F, such that the emitter nodes 330A-C are coupled to the collector nodes 320D-F via respective node lines 360A-C. Furthermore, the collector nodes 320A-C of switching elements 250A-C are coupled together, while the emitter nodes 330D-F of switching elements 250D-F are also coupled together. The power converter 100 also includes the DC-link capacitor 120 that is coupled at its anode to the collector node 320C, and coupled at its cathode to the emitter node 330F, which thereby forms the interface of a DC output bus 400.

Each phase of the three-phase variable frequency power source 140 is coupled to the power converter 100 via power lines 500A-C that maintain respective line reactors 510A-C in-line therewith. It should be appreciated that the line reactors 510A-C comprise an inductor, to provide impedance to the power lines 500A-C, so as to reduce input harmonics and to buffer against low-magnitude current spikes generated by the mains power source 140. Furthermore, the power source 140 may comprise any suitable power generator, consisting of any number of phases, such as a turbine driven generator that generates power at varying output frequencies.

Figure 2:
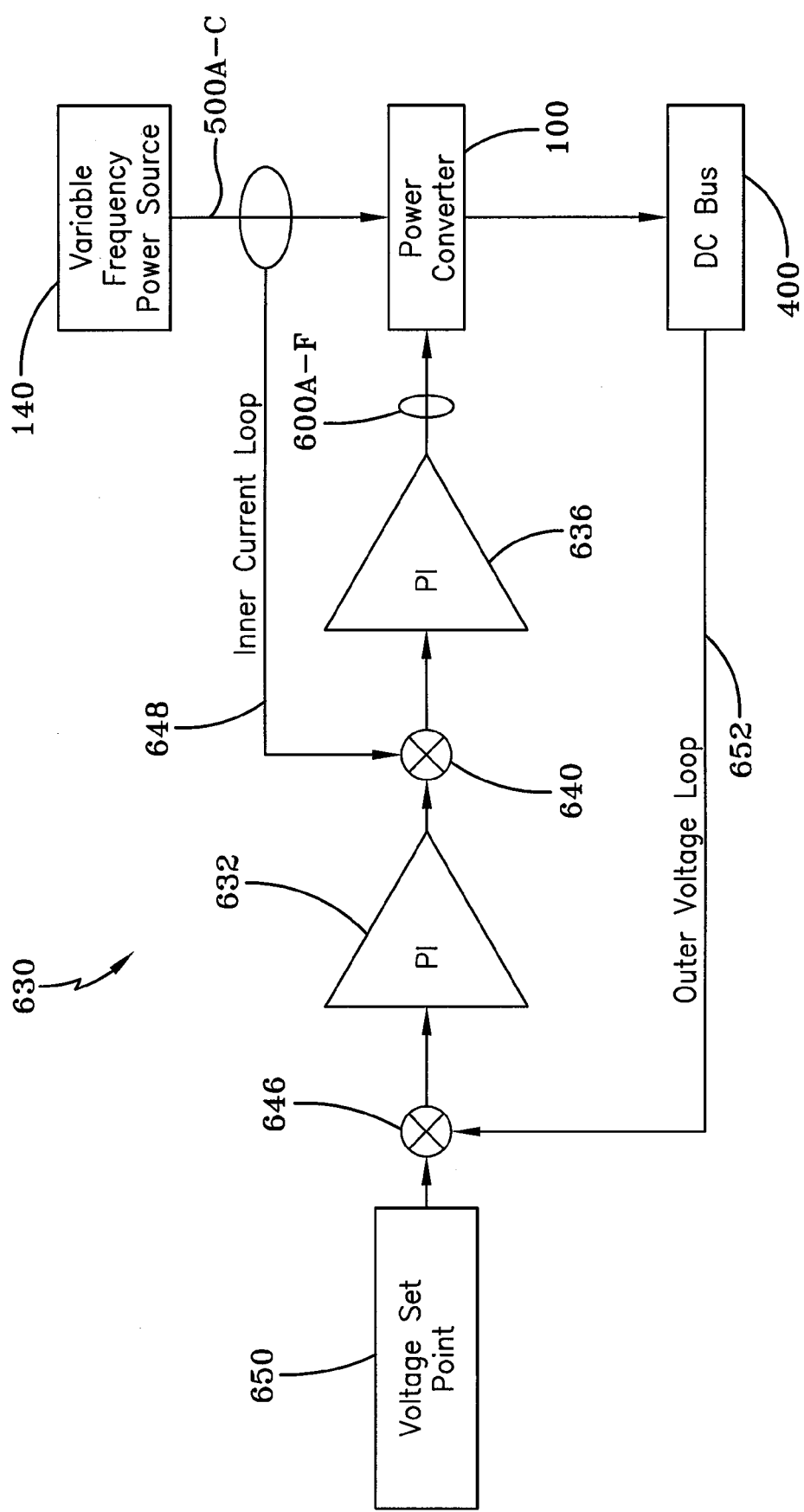
FIG. 2 is a block diagram of the feed back control structure utilized by poly-phase AC/DC active power converter during its AC to DC conversion process in accordance with the concepts of the present invention.

To switch each IGBT 110A-F between ON and OFF states in the manner to be discussed, the DSP controller 200 is coupled to the gate terminal (G) of each IGBT 110A-F via control lines 600A-F. The DSP controller 200 includes the necessary hardware and/or software needed to carry out the functions to be discussed. It should also be appreciated that the DSP controller 200 may be replaced with any other suitable controller, microcontroller, or other computing device that provides the necessary functions to carry out the operation of the converter 100. In particular, the DSP controller 200 employs a control structure 630, as shown in FIG. 2, that monitors the electrical current consumed by the converter 100, and the voltage supplied at the DC bus 400 by the converter. As such, the DSP controller 200 applies pulse width modulation (PWM) control signals with suitable duty cycles to control lines 600A-F in order to switch the IGBTs 110A-F ON and OFF to convert the three-phase variable frequency input power from the power source 140 into DC power.

Specifically, in the normal AC/DC converter mode, the control structure 630 implemented by the DSP controller 200 used to control the switching of the IGBTs 110A-F of the H-bridge 130 is represented by a pair of series coupled proportional integral (PI) controllers 632 and 636 that are separated by a summing point 640. Specifically, the output of PI controller 636 is coupled to the converter 100 via control lines 600A-F, while the input of PI controller 632 is coupled to another summing point 646. As such, the summing point 640 receives the magnitude of the current consumed by the converter 100 from the power source 140, via an inner current loop 648, as commanded by the output of the PI controller 632, to thereby define a current error value that is utilized by the PI controller 636 to control the current consumed by the converter 100. The control structure 630 is also configured, whereby the summing point 646 maintained at the input of the PI controller 632 receives a predetermined voltage set point value 650 maintained by the DSP controller 200, and the magnitude of the voltage output by the converter 100 via the DC bus 400 from an outer voltage loop 652 to thereby define a voltage error value. Thus, during normal operation, the loop 652 is used to maintain the voltage output at the DC bus 400 at a constant value established by the voltage set point value 650. In the event the voltage at the DC bus 400 varies from the voltage set point value 650, the current controller 632 generates a current command value at its output to compensate for the change in voltage at the DC bus 400. This commanded current value is used to define the current error that is input into controller 636, which modulates the switching of the IGBTs 110A-F, so as to adjust the current consumption of the converter 100 so as to maintain the voltage of the DC bus 400 at the voltage set point value.

Thus, during normal operation, DSP controller 200 determines the proper conduction angle of the current consumed by the converter 100 from the power source 140 and calculates the voltage error value at the output of summing point 646 and the current command value at the output of summing point 640, which are used to adjust the duty cycle of the PWM signals applied to control lines 600A-F to control the amount of current consumed from the variable frequency power source 140 in order to maintain the DC bus 400 at the DC voltage established by the voltage set point value 650.

However, the control loops 652 and 648 of the control structure 630 require a voltage gain or a voltage potential difference between the peak voltage supplied by the power source 140 and the voltage at the DC bus 400 to remain stable and in control, in order to allow the converter 100 to output DC power as the frequency of the power source 140 varies. However, this voltage potential between the power source 140 and the DC bus 400 or voltage gain is generally not present upon the initial cold start-up of the converter 100, thus causing the control structure 630 to operate in an unstable manner, which results in an unwanted inrush of current into the converter 100. That is, on a cold start of the power converter 100, when it is initially placed into its normal operating mode, the actual gain, in the form of current error, available at the input the PI controller 636 is not defined due to the lack of voltage potential difference between the power source 140 and the DC bus 400. As a result, the operation of the PI controller 636 becomes unstable, causing it to control the H-bridge 130 in a manner that allows an uncontrolled inrush of current to enter the converter 100, thereby generating electrical current spikes and other distortion. Thus, the processes used to enable the converter 100 to generate a voltage gain needed to generate a current error value at the input of the PI controller 636 to enable its stable operation on the initial or cold start of the converter 100 will now be discussed below. It should be appreciated that the voltage gain value is normally some percentage above that of that supplied by the power source 140.

Reconfiguration Operation

Figure 3:
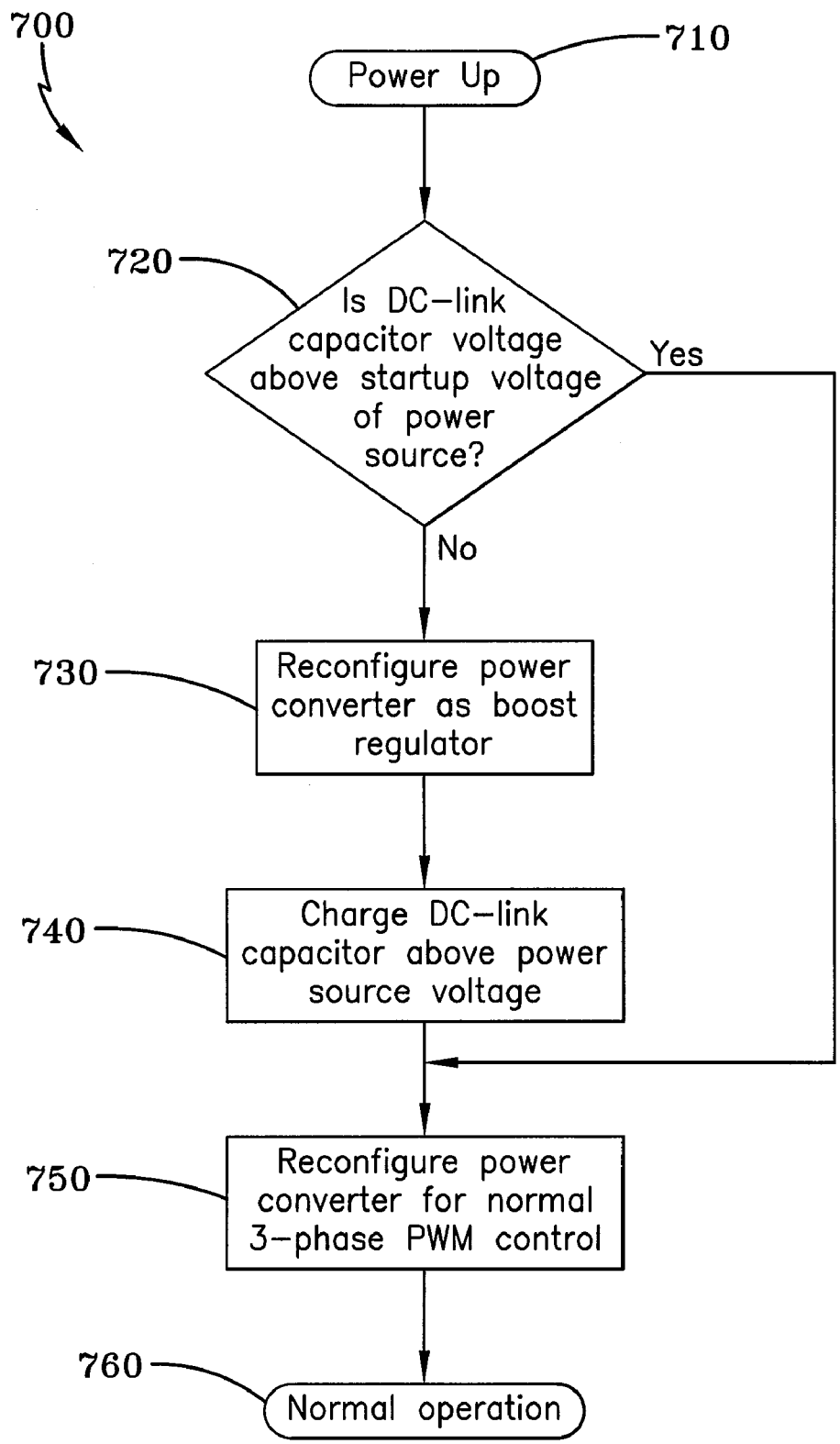
FIG. 3 is a flow diagram showing the operational steps taken by poly-phase AC/DC active power converter during its operation when switching from an initial boost regulator mode to a normal operating mode in accordance with the concepts of the present invention.
Figure 4:
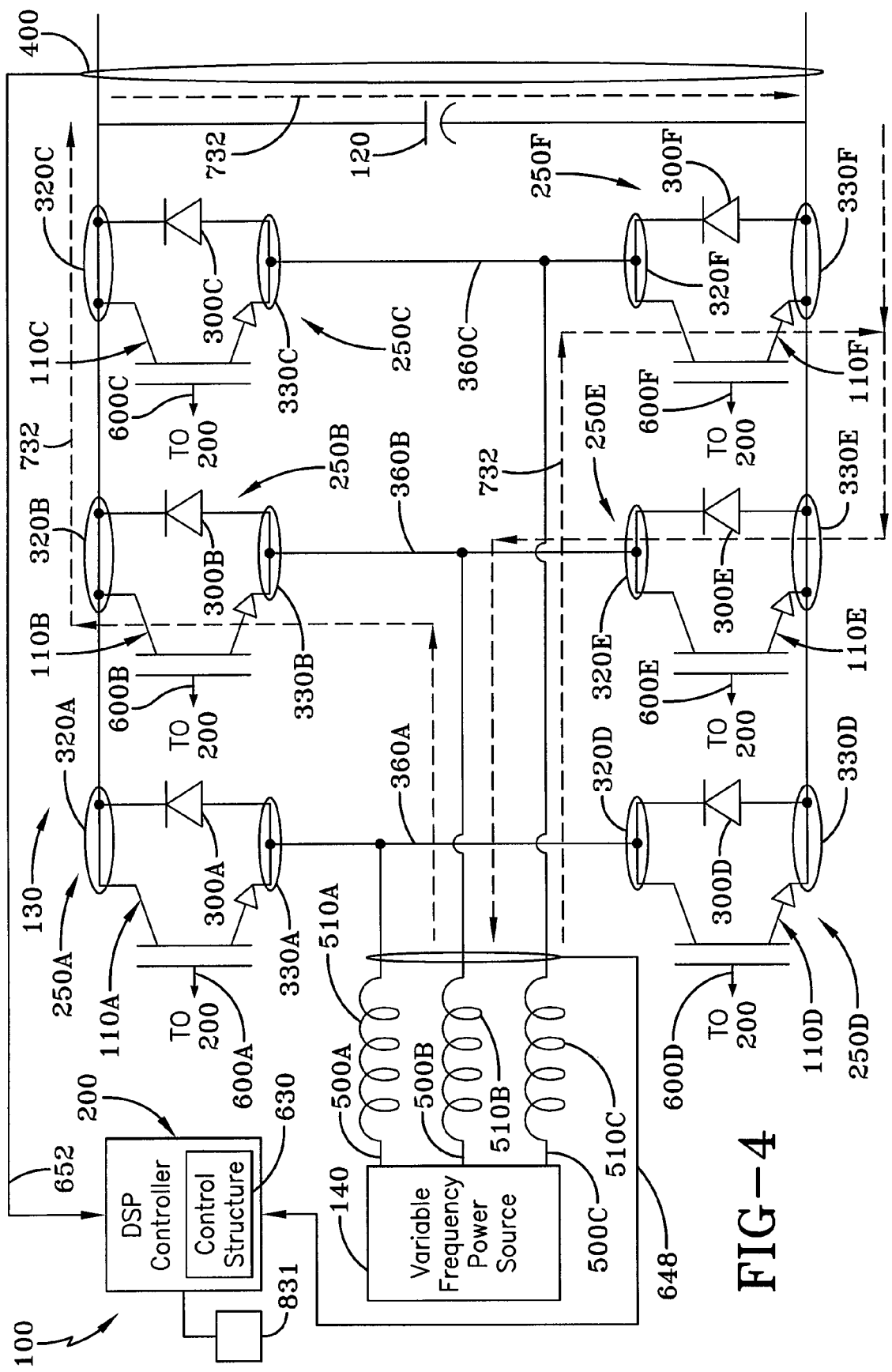
FIG. 4 is a schematic view of the poly-phase AC/DC active power converter when reconfigured by the DSP controller to operate in a boost regulator mode showing the current path taken to charge line reactors maintained by the power converter in accordance with the concepts of the present invention.

To provide an amount of voltage gain during the initial start up of the converter 100 to enable the control loops 648 and 652 to operate in a stable manner, the DSP controller 200 reconfigures the H-bridge 130 so that it functions in a boost regulator mode, whereby the DC-link capacitor 120 of the DC bus 400 is charged to a voltage that exceeds that of the power source 140. The operational steps taken by the converter 100 to carry out the boost regulator mode are generally referred to by the numeral 700, as shown in FIG. 3 of the drawings. Initially, at step 710, the DSP controller 200 is started. Next, at step 720, the DSP controller 200 determines if the converter 100 is being cold started. That is, the controller 200 determines if sufficient voltage exists at the DC bus 400 to generate the voltage gain needed by the control structure 630 to enable its normal, stable operation. If the DSP controller 200 determines that the voltage at the DC bus 400 is insufficient, whereby it is not greater than that provided at the power source 140, the process 700 continues to step 730. At step 730, the DSP controller 200 places the H-bridge 130 into a boost regulator mode so that the power converter 100 operates as a boost regulator, as shown in FIG. 4. The DSP controller 200 switches the appropriate IGBTs 110A-110F ON and OFF, such that the line reactors 510A-510C are charged by placing them across the lines 500A-C of the power source 140, and then discharged into the DC-link capacitor 120. However, it should be appreciated that there are any scenarios known in the art of transistor switching that would allow current to be built up in the line reactors 510.

Figure 5:
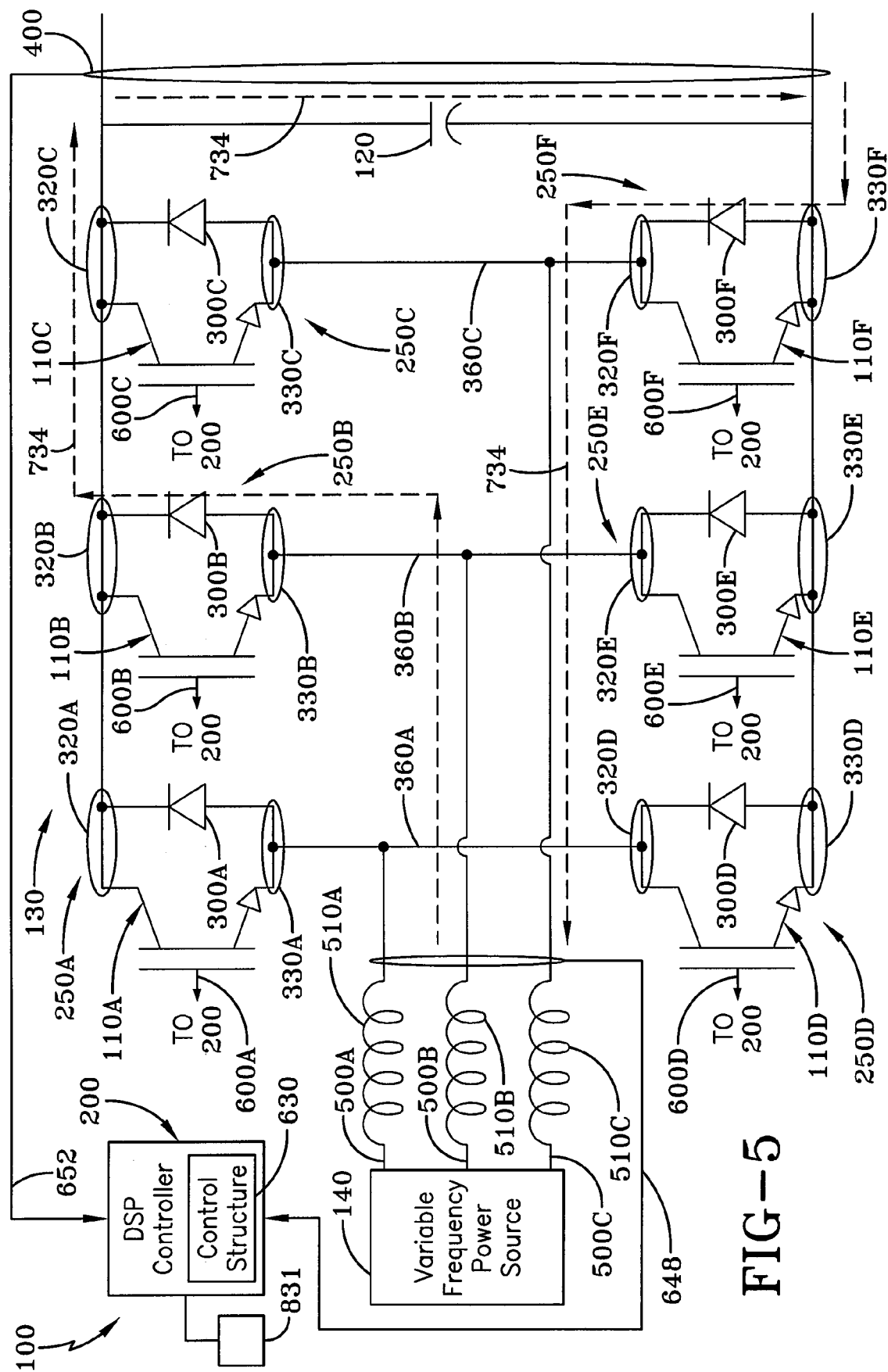
FIG. 5 is a schematic view of the poly-phase AC/DC active power converter when reconfigured by the DSP controller to operate in the boost regulator mode showing the current path taken to charge a DC-link capacitor using the energy stored by the line reactors in accordance with the concepts of the present invention.

For example, in boost regulation mode, IGBT 110F is turned on at the correct point in time for a predetermined amount of time, during which current from the variable frequency power source 140 flows through line reactor 510B and through line reactor 510C, as indicated by the current path 732 shown in FIG. 4. Continuing, when IGBTs 110F is turned off, the energy stored in line reactors 510B and 510C flows through diodes 300B and 300F, as shown by the current path 734 in FIG. 5, thereby transferring this energy into the DC-link capacitor 120. In one aspect, the amount of time that the IGBT 110F is turned on or off is chosen, so that the current built-up in the line reactor 510B and 510C remains at safe level to allow the system to charge in a reasonable amount of time.

Thus, by operating the H-bridge 130 as a boost regulator, the voltage of the DC-link capacitor 120 is charged to a start-up voltage value that exceeds the peak voltage of the power source 140, as indicated at step 740. After the DC-link capacitor 120 has been charged, the process 700 continues to step 750, where the DSP controller 200 disables the boost mode and places the power converter 100 into its normal operating mode of AC/DC power conversion, as indicated at step 760. Whereby, each phase of the AC power from the variable frequency power source 140 is supplied to the power converter 100 to charge the DC link capacitor 120 of the DC bus 400 to a peak value of the voltage that has been defined by the voltage set point value 650.

However, returning to step 720, if the DSP controller 200 determines that there is a sufficient voltage difference to establish the gain value used by the control structure 630, the process proceeds directly to step 750, where the converter 100 is placed in a normal AC/DC conversion mode, as previously discussed.

Synchronization

Figure 6:
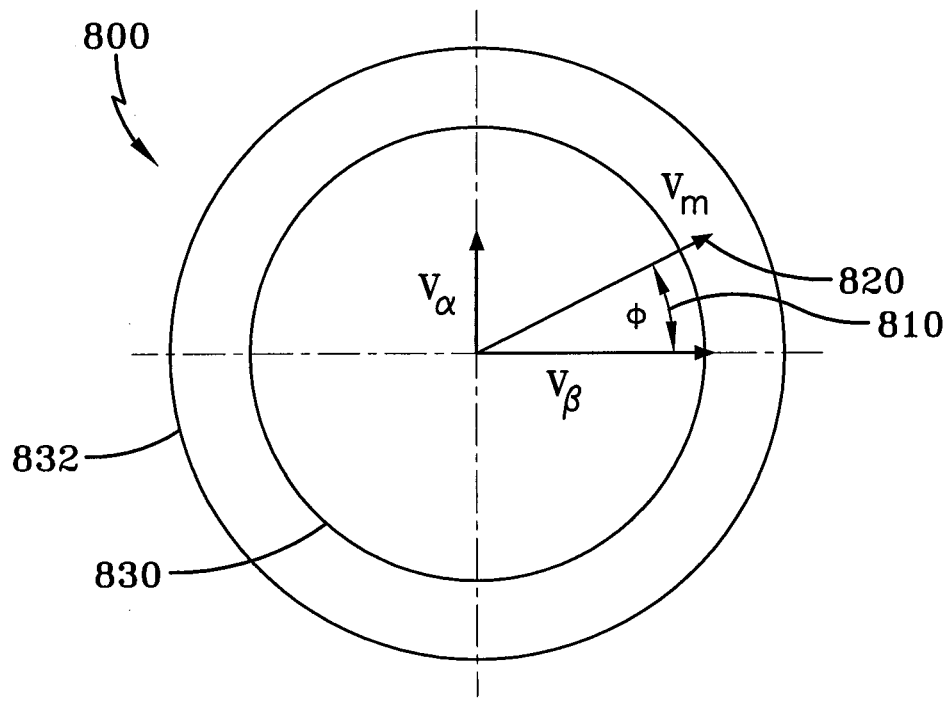
FIG. 6 is a vector diagram showing the conduction angle calculations utilized by the poly-phase AC/DC active power converter in accordance with the concepts of the present invention.

In order to achieve a unity or near-unity power factor by the power converter 100 when used with the variable frequency power source 140, the DSP controller 200 utilizes a geometric synchronization technique. This technique tracks the conduction angle of the power supplied by the power source 140 and commands the current consumed by the converter 100 in a manner to provide low harmonic distortion and unity or near-unity power factor, as discussed below. Specifically, the DSP controller 200 utilizes the Park/Clark and Inverse Park/Inverse Clark arithmetic transforms to provide the required current loop control utilized by the controller 636 of the control structure 630. Initially, as shown in FIG. 6, the DSP controller 200 applies the Clark transform, whereby the voltage of each of the three phases 500A-C of the variable frequency power source 140, which are initially defined as a three-phase vector state, are converted into a two-phase rotating vector 800. The resultant angle of the two-phase rotating vector 800 is calculated as a conduction angle 810 of the power supplied from the power source 140 and is utilized by the DSP controller 200 and the Inverse Park/Inverse Clark transform to control the IGBTs 110A-F of the H-bridge 130 via control lines 600A-F to achieve unity or near-unity power factor, as discussed below.

Specifically, in order to carry out the Park/Clark transform, two out of the three-phase voltages $V_a$, $V_b$, and $V_c$ of the power source 140 supplied via respective power lines 500A-C are required, such that the two-phase vectors are defined as $V_\alpha$ and $V_\beta$, whereby $$V_\alpha = V_a,\ V_\beta = \frac{(V_a + 2V_b)}{\sqrt{3}}\ \text{and}\ V_a + V_b + V_c = 0.$$

Once each of the phase voltages $V_a$, $V_b$, and $V_c$ of the power source 140 are converted into two-phase rotary coordinates, the conduction angle 810 of the power consumed by the converter 100 from the variable frequency power source 140 is calculated using the Arc Tangent function: Line Conduction Angle $$\Phi = \text{Arctan}\left(\frac{V_\beta}{V_\alpha}\right) + 90 + \text{offset.}$$

The offset value is used to compensate for delays in signal processing, which may include sampling delay and filter phase lags, associated with the operation of the DSP controller 200. Once calculated, the conduction angle ($\Phi$) 810 is then used by the DSP controller 200 to compute the inverse Park and the inverse Clark transform so that the current consumed by the converter 100 from the variable frequency power source 140 is in phase with the voltage supplied thereby, so as to provide a unity or near-unity power factor.

Specifically, the inverse Park transform is given by:

$V_\alpha = Vd*\text{Cos}\ \Phi - Vq*\text{Sin}\ \Phi$ $V_\beta = Vd*\text{Sin}\ \Phi + Vq*\text{Cos}\ \Phi$, whereby $Vd$ and $Vq$ are command voltages for the direct and quadrature axis that are calculated by the PI controller 632 of the control structure 630.

And the inverse Clark transform is given by:

$$Vr1 = V_\beta$$

$$Vr2 = \frac{(-V_\beta + \sqrt{V_\alpha})}{2}$$

$$Vr3 = \frac{(-V_\beta - \sqrt{V_\alpha})}{2},$$

whereby Vr1, Vr2, Vr3 represents the rotary voltage commands used by the control structure 630 to enable the synchronous operation of the controller 100.

In other words, the controller 200 processes the conduction angle ($\Phi$) 810 via the inverse Park transform to generate $V_\alpha$ and $V_\beta$ that are used by the inverse Clark transform to generate the 3 phase rotary voltage commands Vr1, Vr2, and Vr3. The 3 phase rotary voltage commands Vr1, Vr2, and Vr3 are used by the controller 200 to control the switching of the IGBTs 110A-F to adjust the phase angle of the current consumed by the H-bridge 130 so that it matches the phase angle of the voltage output by the power source 140, thereby enabling a unity or near-unity power factor to be achieved.

In addition to providing unity power factor operation, the 2-phase vectors $V_\alpha$ and $V_\beta$ generated from the Clark/Park transform can also be used by the DSP controller 200 to calculate a resultant vector 820, which is defined as $V_m = \sqrt{(C_\beta^2 + V_\alpha^2)}$. The resultant vector $V_m$, allows quick and convenient error checking for both the incoming line voltage range and missing phase detection provided by the variable frequency power source 140. Whereby if the calculation of vector 820 results in a vector length lower than a minimum vector length 830, the DSP controller 200 generates a visual and/or audible prompt via an indicator 831 maintained to indicate that the incoming power from the power source 140 has fallen out of predetermined specifications. Similarly, if the calculation of resultant vector 820 results in a vector, which exceeds a maximum vector length 832, the DSP controller 200 generates a visual and/or audible prompt via the indicator 831, to indicate that the incoming power from power source 140 has fallen out of predetermined specifications. As such, by monitoring the fluctuation of the resultant vector 820, various electronic components coupled to the output of the converter 100, may be shut down to avoid damage thereto, should the output power of the power source 140 fall outside predetermined specifications, such as in the case of an overvoltage event.

Figure 7:
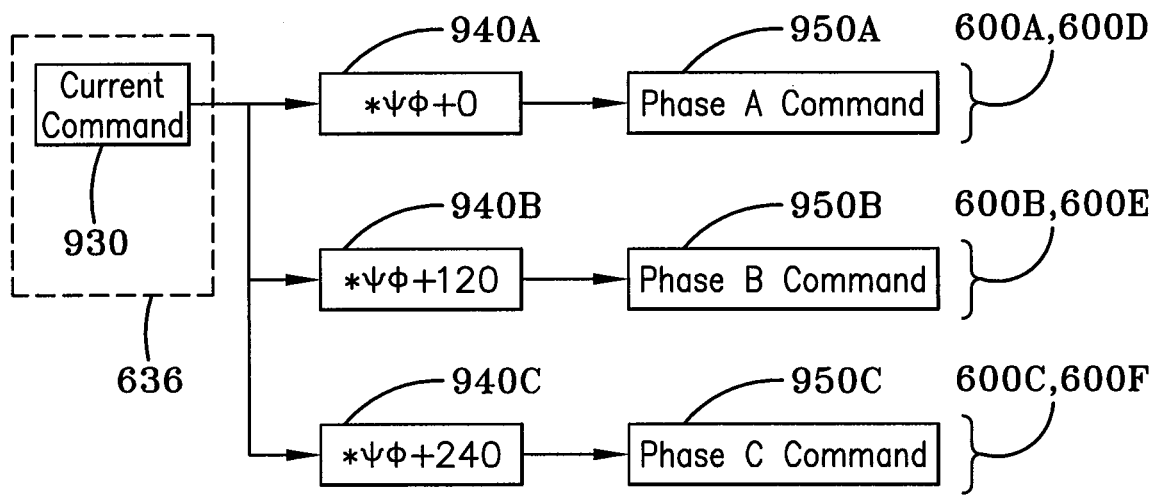
FIG. 7 is a diagrammatic view of the command modulation techniques implemented by the poly-phase AC/DC active power converter to modify line harmonics to improve total harmonic distortion in accordance with the concepts of the present invention.

With reference to FIG. 7, the converter 100 may be configured whereby the current controller defined by PI controller 636 generates a modulated current command 930 to reduce the harmonic distortion associated with power consumed by the converter 100 from the power source 140. As previously discussed, the current controller defined by the PI controller 636 receives its command signal from PI controller 632, and, in concept, PI controller 632 provides an output for each phase 500A-C of the power source 140. As such, each phase 500A-C of the power source 140 has an associated current command 930 generated by the PI controller 632 that is used to control the switching of the IGBTs 110A-F. Specifically, the current command 930 is modulated by the arithmetic conditions 940A-C embodied by the DSP controller 200, which are defined respectively as: $I_{cmdA} = I_{cmd} * \mathrm{Sin}(\Phi)$; $I_{cmdB} = I_{comd} * \mathrm{Sin}(\Phi + 120 \text{ degrees})$; and $I_{cmdC} = \mathrm{Sin}(\Phi + 240 \text{ degrees})$. As such, the current command 930 generated by the current controller 632 is further modulated by the arithmetic conditions 940A-C to generate individual current control commands 950A-C that are supplied to the IGBTs 110A-F via control lines 600A-F, to control current consumed from each of the three phases 500A-C of the power source 140. Thus, control lines 600A/600D provide the modulated current command 950A, control lines 600B/600E provides the modulated current command 950B, and control lines 600C/600F provide the modulated current command 950C to the H-bridge 130 to control the consumption of current from the power source 140.

However, by varying the Sin function of the arithmetic conditions 940A-C via harmonic injection, lookup tables, or conduction angle modulation, the harmonic current content of the power consumed by the converter 100 from the variable frequency power source 140 can be altered. In one aspect, instead of modulating the current command 930 with a pure sinus function Φ, it can be modulated with harmonics that trim the current command ψ to reduce total harmonic distortion of the power consumed from the variable frequency generator 140. To achieve this operation, the converter 100 implements inverse Park and inverse Clark arithmetics, as discussed above, to provide this control, so it is angle fed into the inverse Park transform that is modified to provide the harmonic control.

It is also contemplated that by monitoring the rate of change (dΦ/dt) of the conduction angle 810 allows for monitoring the frequency of the power received by the H-bridge 130 from the power source 140, while the second differential of (dΦ/dt) allows additional compensation techniques to be employed, such as an acceleration feed forward or time lag compensation, to be performed by the converter 100. In particular, feed forward compensation can be used to compensate for delays experienced by the converter 100, which may improve line conduction angle 810 tracking that is achieved by the converter 100.

Therefore, one advantage of the present invention is that a poly-phase AC/DC active power converter controls an H-bridge to operate in a boost mode to generate a voltage difference (gain value) for use in a normal mode to prevent the inrush of electrical current from a variable frequency power source coupled thereto. Another advantage of the present invention is that the poly-phase AC/DC active power converter has reduced size and is lightweight.

Yet another advantage of the present invention is that the poly-phase AC/DC active power converter utilizes real-time geometric calculations to track the conduction angle, monitor status, and allow harmonic correction to the incoming frequency of the power output by a variable frequency power source in order to provide unity or near-unity power factor, low or controllable total harmonic distortion, improved frequency change tracking, and simplified error detection.

Thus, it can be seen that the objects of the invention have been satisfied by the structure and methods presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A poly-phase AC/DC active power converter to convert AC power from a poly-phase variable frequency power source into DC power, comprising:
    an H-bridge converter maintaining a capacitor at its output, said converter adapted to receive each of the phases of AC power source at its input through respective line reactors inline therewith; and
    a controller coupled to said H-bridge converter to control said converter in accordance with a control structure, wherein upon the initial powering of said H-bridge, said controller enters a voltage boost mode, such that said line reactors are charged and discharged into said capacitor to raise its voltage above that of said power source, to generate a gain value used by said control structure to control the current consumed from the power source, so as to maintain a constant output voltage during the start up of a normal AC/DC conversion mode, so as to reduce an inrush of current during the conversion of AC power into DC power.

2. The poly-phase AC/DC active power converter of claim 1, wherein said line reactors comprise inductors.

3. The poly-phase AC/DC active power converter of claim 1, wherein said H-bridge comprises:
    first, second, third, fourth, fifth, and sixth switching elements each coupled to said DSP controller, said switching elements having a first node and a second node, said first node of said first, second and third elements being coupled together, and said second nodes of said fourth, fifth, and sixth nodes are coupled together, and said second nodes of said first, second, and third switching elements coupled in series with said first node of said fourth, fifth, and sixth switching elements at respective connection nodes; and a plurality of power lines adapted to be coupled at one end to one phase of the poly-phase power source, and another end adapted to be coupled to one of said connection nodes.

4. The poly-phase AC/DC active power converter of claim 3, wherein said switching elements comprise a diode in parallel with an insulated gate bipolar transistor (IGBT).

5. The poly-phase AC/DC active power converter of claim 3, wherein said capacitor is in parallel with said third and sixth switching elements.

6. The poly-phase AC/DC converter of claim 3, wherein said controller comprises a digital signal processing (DSP) controller.

7. The poly-phase AC/DC converter of claim 3, wherein said line reactors are charged by controlling said switching elements so that at least two said line reactors are placed across the power source.

8. The poly-phase AC/DC converter of claim 7, wherein said capacitor is charged by the discharge of said line reactors into said capacitor by switching said switching elements off.

9. The poly-phase AC/DC converter of claim 1, wherein said controller calculates a conduction angle of the current consumed from the power source, and controls the operation of the H-bridge so that the current consumed thereby is in phase with the voltage supplied by the power source to provide a near-unity power factor.

10. The poly-phase AC/DC converter of claim 9, wherein said controller is configured to modulate said conduction angle to modify the harmonic content of the current consumed by said converter to reduce the total harmonic distortion of the power consumed thereby.

11. The poly-phase AC/DC converter of claim 9, wherein said controller is configured to generate the second differential of said conduction angle in order to provide time lag compensation.

12. A method of controlling an H-bridge to convert AC power from a poly-phase power source into DC power comprising:

providing an H-bridge power converter maintaining a DC-link capacitor at its output;

providing a controller to control said H-bridge in accordance with a control structure;

coupling the input of said H-bridge to the power source;

operating said H-bridge in a boost mode, so as to charge said DC-link capacitor to a voltage above the voltage of the power source to generate a gain value;

executing said control structure with said gain value to control the current consumed by said converter to maintain a constant output voltage; and operating said H-bridge in a normal mode, so as to convert AC power from the power source into DC power.

13. The method of claim 12, further comprising:

determining whether the voltage of said DC-link capacitor is above the voltage of the power source prior to said first configuring step.

14. The method of claim 12, wherein said first operating step and said executing step are not performed if the voltage of said DC-link capacitor is above the voltage of the power source.

15. A method of controlling an AC/DC power converter to convert AC power from a 3-phase power source into DC power comprising:

providing an H-bridge having a DC output bus, which maintains a DC-link capacitor;

providing a controller to control said H-bridge in accordance with a control structure;

representing at least 2 of the 3 phase voltages output from the power source as vectors in two-phase rotary coordinates;

calculating a conduction angle of the power consumed from the 3-phase power source from said vectors using an arc-tangent function; and controlling said H-bridge to adjust the phase angle of the current consumed from the power source to match the phase angle of the voltage provided by the power source at said DC output bus, to provide unity power factor.

16. The method of claim 15, wherein said calculating step is performed using an arc-tangent function.

17. The method of claim 15, further comprising:

calculating the conduction angle of the power consumed from the power source; and controlling said H-bridge, such that current consumed from the 3-phase power source is in phase with the voltage provided by the power source to provide near-unity power factor.

18. The method of claim 17, further comprising:

modulating said conduction angle to modify the harmonic content of the current consumed by the converter to reduce total harmonic distortion of the power consumed thereby.

19. The method of claim 17, further comprising:

generating the second differential of said conduction angle to provide time lag compensation.

20. The method of claim 15, further comprising:

generating a resultant vector from said at least two vectors;

comparing said resultant vector with a predetermined range; and generating a prompt if said resultant vector is outside of said predetermined range.

* * * * *